Sept. 3, 1957 H. HACK 2,804,775
MEANS FOR THE BALANCING OF REVOLVABLE BODIES
Filed Jan. 25, 1952 4 Sheets-Sheet 2
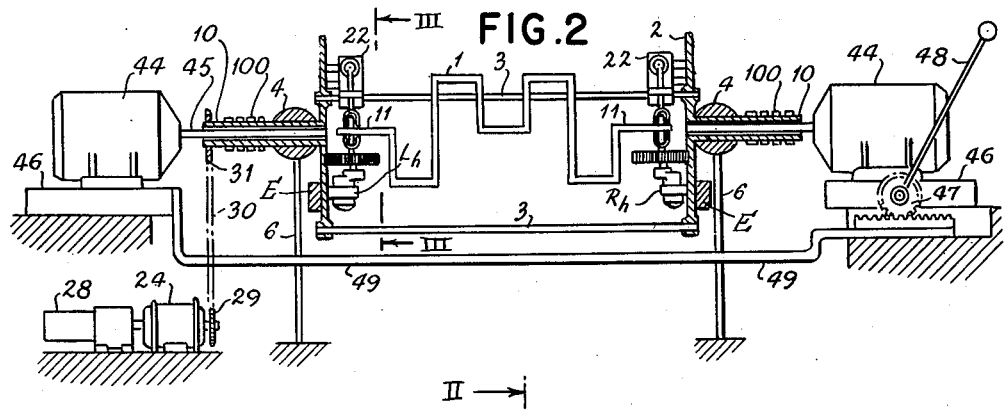
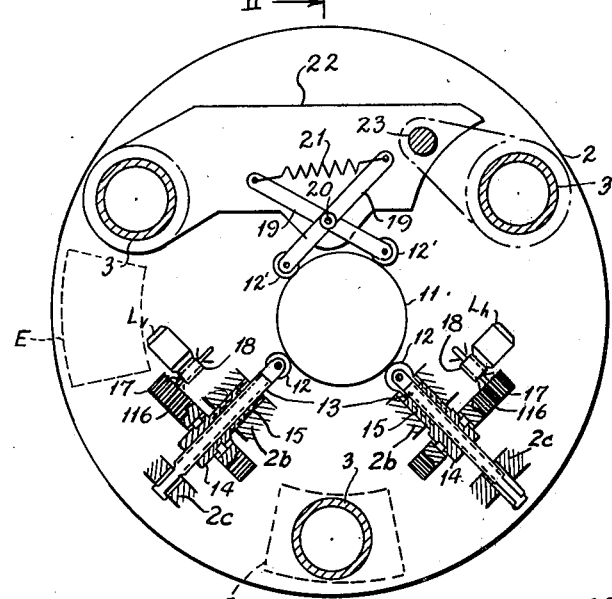
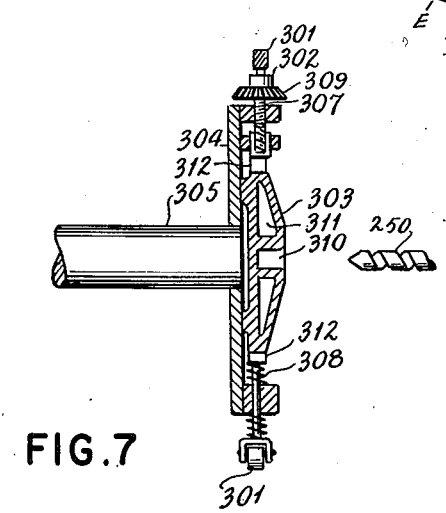
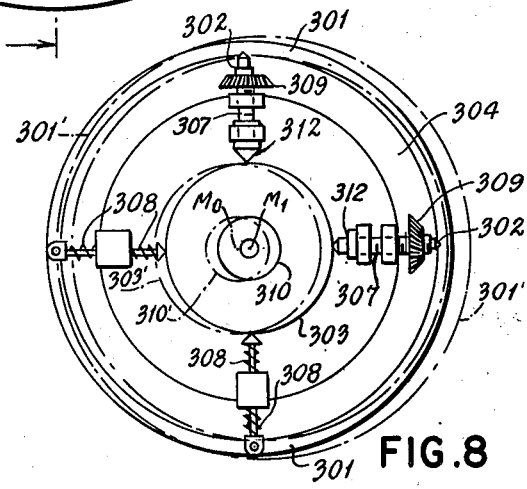

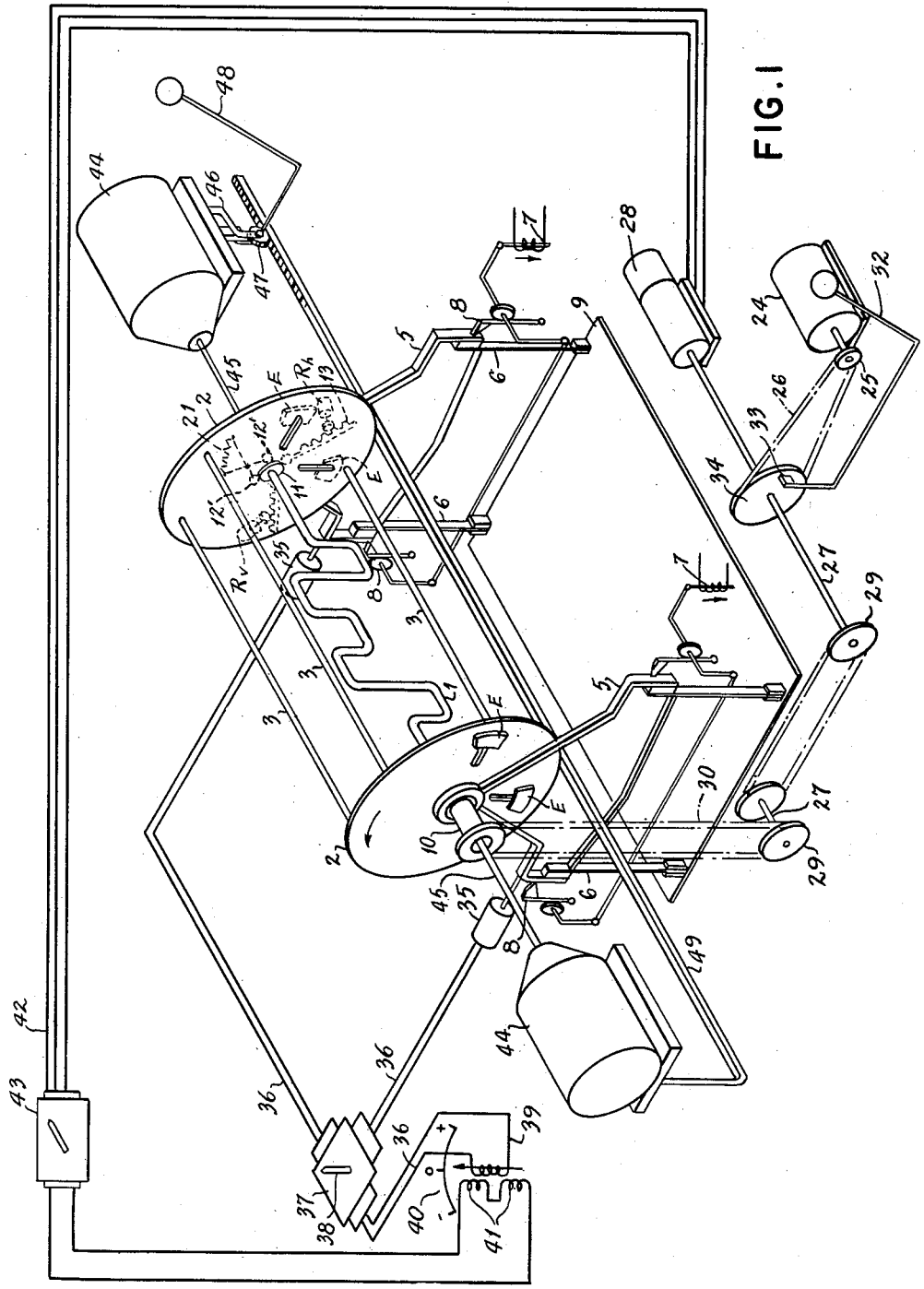

Sept. 3, 1957 H. HACK 2,804,775
MEANS FOR THE BALANCING OF REVOLVABLE BODIES
Filed Jan. 25, 1952 4 Sheets-Sheet 3

Sept. 3, 1957  H. HACK  2,804,775
MEANS FOR THE BALANCING OF REVOLVABLE BODIES
Filed Jan. 25, 1952  4 Sheets-Sheet 4

United States Patent Office 2,804,775
Patented Sept. 3, 1957

2,804,775

MEANS FOR THE BALANCING OF REVOLVABLE BODIES

Heinrich Hack, Gross Zimmern, near Darmstadt, Germany, assignor to Carl Schenck Maschinenfabrik G. m. b. H., a corporation of Germany Application January 25, 1952, Serial No. 268,156
In Germany March 31, 1950

Public Law 619, August 23, 1954
Patent expires March 31, 1970

4 Claims. (Cl. 73—461)

This application is a continuation-in-part of my copending application Serial No. 230,929 filed June 11, 1951, now abandoned, and is also related to the copending application Serial No. 230,928, filed June 11, 1951, now Patent Number 2,746,299, for Apparatus for the Balance Centering of Revolvable Bodies, of which I am a co-inventor.

My present invention relates to means for balancing revolvable bodies and, more particularly to the balancing and centering of bodies that are to be subsequently subjected to a balance-affecting machining or other fabricating operation.

In many cases, especially with work pieces of balance-asymmetrical shapes such as eccentric rotor structures, the subsequent machining of a prebalanced body is apt to introduce new unbalance so that, with the known methods, a considerable extent of rebalancing remains necessary and the occurrence of appreciable waste is not obviated despite a preceding balance centering. The workpieces may also be asymmetrical at the beginning of the machining operation when certain spots of the body have added material supposed to balance such other material as will be eliminated from the body in the course of the machining operation. With bodies prefabricated by die-forging, a difference in the bevelling or uneven wear of the dies may have unbalance producing effects. There are also workpieces which by their very nature require an uneven mass distribution in the completed body, as is the case for instance with eccentric cams. When such bodies of greatly uneven mass distribution are accurately center-balanced prior to final machining, it may happen that parts of the body remain unmachined. To prevent this, it has been proposed to intentionally provide the body with false center marks and to dynamically balance the body only after final machining, a considerable amount of balancing by correctively adding or removing material then being needed.

Relating to operations of the above-mentioned kind, involving the centering or center marking of unfinished bodies that are to be subsequently subjected to a balance-affecting fabricating operation, it is an object of my invention to improve the entire procedure and to minimize the totality of required balancing operations so that the workpiece, once being center adjusted prior to final machining, approaches or virtually fully assumes the desired balance as a result of the subsequent machining thus obviating or greatly minimizing the need for further balancing by correction of mass distribution.

To this end, and in accordance with an object of my invention, I combine the final machining of the unfinished or prefabricated bodies with the balance-establishing operation into a single fabricating process so that the body, when finished, will revolve free or substantially free of unbalance oscillations and with a concentric run of its essential zones. More specifically, the workpiece body, while revolving, is first center-adjusted to such a particular discrepancy of its inertia axis from its axis of revolution that the subsequent machining of the body about the adjusted center axis acts toward establishing the desired ultimate balance.

As a rule, the displacement of the unfinished body to be center balanced from coincidence of the inertia and revolving axes is relatively small so that it can be eliminated and the body be finished for accurate running of all essential body zones simply by removal of material from the exterior and/or interior of the body, i. e. by machining the body about its axis of revolution.

The unfinished bodies to be center-balanced in this manner, are preferably somewhat overdimensioned so that, corresponding to the maximum unbalance with which the body may be affected, a definite measure determined by the geometric dimensions of the body is added to the exterior radius and/or the interior radius, so that in any event the body can be made to run free of wobbling with these preselected oversize radii or zones and that the unbalance intentionally permitted to remain in the center body will vanish during the final machining.

The foregoing and other objects and advantages, as well as the features of the invention, these features being set forth with particularity in the claims annexed hereto, will be understood from, or will be referred to, in the following in conjunction with a description of the embodiments illustrated on the drawings in which:

Figs. 1 to 3 illustrate a balancing machine according to the invention, Fig. 1 being a diagrammatic and perspective view, Fig. 2 a longitudinal section along the line II—II indicated in Fig. 3, and Fig. 3 a section through a cage structure of the machine along the line III—III indicated in Fig. 2;

Fig. 7 is a schematic lateral and sectional view of a jig or cage structure with a body to be centered according to the invention, the section being taken in the plane denoted by VII—VII in Fig. 8;

Fig. 8 is a front view of the structure shown in Fig. 7;

Figure 4:
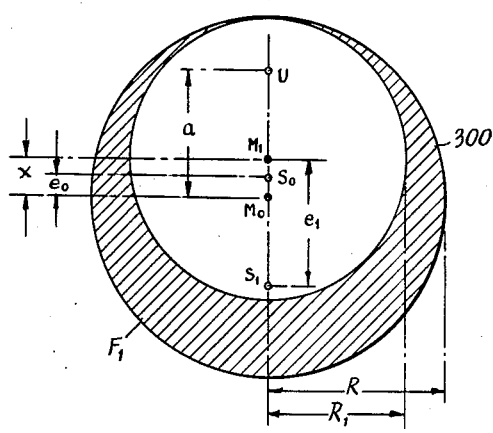
Figs. 4 and 5 are explanatory and show respectively a front view and an axial section of unfinished rotors affected by unbalance, purposely shown exaggerated.

The apparatus according to the invention will best be understood if one is familiar with an example of balancing apparatus of the kind suitable for the invention. Before dealing with the invention proper, therefore, such an example will first be described with reference to Figs. 1 to 3 to the extent necessary for the complete understanding of the invention. As far as described, the apparatus illustrated in Figs. 1 to 3 is similar to that shown and described more in detail in the above-mentioned copending application Serial No. 230,928, except for a modification required for the present invention.

Referring to Fig. 1, a body 1 to be balanced and then center bored, in this instance a crankshaft, is rigidly supported in a cage incorporating a pair of discs 2 connected together by rods 3. The cage structure 2, 3 is journalled in bearings 4 of respective bearing bridges 5 mounted on leaf springs 6 so as to be capable of oscillating substantially only in the horizontal direction. Two electromagnets 7 are provided for controlling four stops 8 located on both respective sides of each bearing bridge 5 to permit clamping the bearing bridges against oscillation during drilling and during insertion and removal of the body 1.

An alternating-current motor 24, controlled by a main switch lever 32, serves to drive the cage structure 2, 3 with the enclosed body 1 through an overload slip clutch 25, a V-belt 26 and a belt sheave 34 which is mounted on an intermediate transmission shaft 27 and can be braked by a friction brake 33. Shaft 27 is connected to a two-phase generator 28 capable of generating two alternating currents phased 90° apart. Shaft 27 also carries a sprocket wheel 29 driving through a chain 30, a sprocket wheel 31 on the end of the cage shaft 10. The supports of springs 6 are firmly secured to a machine frame 9 but are displaceable relative to the frame to permit adapting the bearing structures to varying lengths of cage 2, 3. Though for the sake of clarity the motor 24 and generator 28 with the associated parts are shown in Fig. 1 separate from the machine frame 9, it should be understood that they are also mounted on that frame.

Any mechanical oscillations of the bearing bridges 5, resulting from an unbalance of cage 2, 3 and enclosed body 1 during rotation, are transferred to electric pickups 35 which translate the oscillations into alternating voltages. Conductors 36 apply these voltages into a potentiometer network 37 of known type incorporating a part 38 of a four-position switch. From network 37, the alternating voltages after being proportioned by superimposition in the network, are impressed upon a moving coil 39 of a sensitive center-zero wattmeter 40. The alternating currents produced by the generator 28 are fed through conductors 42 to another part 43 of the four-position switch and thence to stationary field coils 41 of the wattmeter 40. The switch part 43, in practice, pertains to the same four-position switch as part 38. Switch part 43 is essentially a selector whose position determines which of the two differently phased alternating currents produced by the generator 28 is fed to the field coils 41 for selectively measuring at a time either the horizontal or the vertical unbalance components. Since the generator 28 is synchronized with the rotation of the cage, the excitation of the wattmeter field coils varies periodically in the rhythm and in the adjusted fixed phase relation to the revolutions of the body to be balanced. The deflection of the wattmeter pointer is proportional to the product of the pickup voltages as applied to moving coil 39 and the phase-adjusted generator current through field coils 41 and, hence, is not dependent upon the absolute value of the unbalance but corresponds to only that component of unbalance which is in phase with the field coil current. Since the generator current is so phase adjusted that it determines the unbalance components in two predetermined and mutually perpendicular directions, the operation of the four-position switch 38, 43 permits obtaining respective wattmeter readings which correspond to the individual four unbalance components i. e. the left-vertical, left-horizontal, right-vertical and right-horizontal unbalance components.

Further details of the electric unbalance analyzing system are not shown and described herein because they are not essential to the invention proper and because suitable systems of this kind are known as such or described in other patents such as U. S. Patent No. 2,706,399 of K. Federn, or in the above-mentioned application Serial No. 230,928.

It will be understood that the terms "horizontal" and "vertical" as here used serve only for indicating a mutual angular relation between the two coordinate directions but are not intended to denote directions relative to space, since any angular position of the cross of coordinate axes may be chosen. It should further be understood that the two coordinate directions, if desired, may include an angle different from 90°, provided the mutual phase displacement of the two reference currents delivered from the generator 28 has a corresponding angular value.

Correlated to the four positions (LV, LH, RV, RH) of the switch are respective electric adjusting motors L$v$, L$h$, R$v$, R$h$, although it will be understood that other electrical or mechanical displacing devices may be used instead. The four adjusting motors are controlled by the four-position switch in such a manner that, dependent upon the selected positioning of the switch, only the one motor is put in operation that is correlated to the unbalance component then being analyzed. This one motor is then operated and displaces the body 1 until the amount of displacement corresponds to the value of component unbalance indicated by the meter 40 with the result that this unbalance is eliminated.

Referring now more particularly to Figs. 2 and 3, the two axial ends 11 of body 1 are each held by four support rollers 12 and 12'. The two support rollers 12' are pivoted about a common fulcrum 20, which is normally stationary and is also the gravity center of a balanced scissor-like lever system on which the rollers 12' are mounted. The two rollers 12' are urged towards one another and into contact with the periphery of the body end 11 by means of a coiled tension spring 21 connecting the two ends 19 of the lever system remote from the rollers 12'. The center of gravity of the scissors system is constant for every angular setting of the two levers relative to each other.

The fulcrum 20 of each lever system is connected to a locking lever 22 pivoted about one of the connecting rods 3 and engageable by a spring-biased latch pin 23 at the end of an arm 22' mounted about another connecting rod 3. The two locking levers 22 are thus securely latched in position during the machine operation by the respective latch pins 23. When the pins 23 are withdrawn, the respective locking levers 22 can be swung upwardly from the position shown in Fig. 3, thereby opening the cage structure to permit the removal or insertion of the body 1.

The two support rollers 12 are journalled on respective threaded spindles 13 (Fig. 3) which are angularly spaced 90° from each other. Each spindle 13 is guided in a sleeve 15 provided with differential threads, namely an inner thread which engages the threaded spindle and an outer thread in engagement with a rigid structure 2$b$. Each spindle 13 is displaceable in its axial direction but is prevented by another rigid structure 2$c$ from revolving about that axis. Each sleeve 15 has a grooved part 14 joined with a spur gear 116. Gear 116 meshes with a pinion 17 driven through a worm drive 18 from one of the four respective adjustment motors L$v$, L$h$, R$v$, R$h$. The difference in pitch of the two threads on spindle 13 and sleeve 15 causes a relative motion in opposite directions to occur between spindle and sleeve when part 14 is being rotated. The amount of the resultant displacement of the spindle is determined by the pitch difference of the two threads. Thus, the spindle mechanism operates as a high reduction gear for converting rotational motion of motor 50 into finely adjustable axial displacement of spindle 13 and roller 12. The weights of the spindles 13 and sleeves 15 are selected in relation to their thread pitches so that a weight balance is maintained for any radial displacement of the spindles. Therefore, a change in adjustment of the spindles 13 and of the scissors system for rollers 121 does not affect the dynamic balance condition of the cage 2, 3.

When the above-mentioned locking levers 22 are closed and latched by the pins 23, the force of the then tensioned springs 21 is so high that the body 1 is prevented from unintentional rotation relative to cage 2, 3 solely by the friction due to the combined pressures of the eight rollers 12, 12'; and the body requires no further clamping means during the center drilling operation to be hereinafter described. Besides, during the drilling operation, the cage 2, 3 is kept freely rotatable in its bearings to permit some rotary movement of the cage for equalizing any differences in torque that may occur, for instance, due to different wear of the drilling tools. However, during the drilling operation the bearing bridges 5 are prevented from oscillation by means of the magnetically operated stops 8 (Fig. 1) above referred to.

The drilling mechanism of the machine comprises two drill spindles 45 (Figs. 1, 2) operable by two respective geared drive motors 44 which are mounted on slides 46. A feed control lever 48 is radially mounted on a spindle which is journalled in the one slide 46 and carries a pinion 47. Pinion 47 meshes with a rack connected through a linking rail 49 to the other slide 46, adjustable stops being provided to limit the permitted feed movement of the drills. It will be apparent that by rotation of the lever 48 to the left, as viewed in Figs. 1 or 2, the two drill spindles 45 are moved toward each other into contact with the respective end faces of body 1. Due to the joining link 49, the drill pressures balance each other and the support and bearings of the cage 2, 3 are kept free of drill pressures.

The machine so far described is similar to the one disclosed in the above-mentioned copending application Serial No. 230,928. However, it differs therefrom in design and operation by the fact that the end discs 2 of its cage or chuck structure are adapted for the accommodation of added masses, consisting of two pairs of weights E shown in Figs. 1 to 3, which when attached to the cage introduce an intentional unbalance error into the revolving system. As a result, the center marks drilled into the workpiece lie on the inertia axis of the whole revolving system but not on the inertia axis of the workpiece that forms only a component of that system. The discrepancy, as will be explained, is such that it substantially vanishes when the workpiece is subsequently subjected to the machining necessary for finishing the work-piece. Each weight E is radially displaceable along a slot or other guide as will be more fully described in conjunction with Figs. 9 to 12.

The operation of the machine shown in Figs. 1 to 3 is as follows. The machine is first calibrated by dynamically balancing the cage without the unbalance weights E and without a body 1 so that the wattmeter 40 will read zero for all positions of the four-position switch 38, 43, 101. When the cage is balanced, the weights E are attached and the body 1 is inserted. The weights have a predetermined mass and a predetermined angular and radial location relative to the workpiece depending upon the amount of unbalance to be subsequently removed by machining as will be more fully explained below. For inserting the body 1, the cage is opened by swinging the locking levers upwardly. After inserting the body 1 in correct angular position with respect to the weights E, i. e. properly indexed as hereinbelow more fully described, the levers 22 are turned downwardly and locked in position by means of the latch pins 23. Then the motor 24 is started and the potentiometer circuit 37 is adjusted to the inertia axis of the entire oscillation system so that the unbalance-responsive displacement at the left-hand end does not influence the unbalance indication for the right-hand end, and vice versa. Once this calibration has been effected, the electric setting may be maintained for all similar bodies to be center bored, for instance for all crankshafts of the same series of manufacture.

The operator may now actuate the main switch lever 32. As mentioned, this has the effect of automatically releasing the cage for rotation. The drive motor 24 as well as the release magnets 7 are energized. Magnets 7 release the previously arrested bearing bridges 5 for oscillatory motion, and the cage is now driven from motor 24 through the chain transmission 29, 30, 31. One of the four unbalance components at a time is now tested and indicated by the meter 40, depending upon the selected position of the four-position switch. Each time the proper adjusting motor of the motors $Lv$, $Lh$, $Rv$ and $Rh$ is started to move the body laterally in the cage so as to compensate for the component of unbalance until the meter reads zero. This procedure is repeated for the other three unbalance components. Thereafter the above-described adjusting operation involving the four motors is terminated. The inertial axis of the revolving composite system is now coincident with the longitudinal axis of the cage, 2, 3 and with the axis of the drill spindles 45.

For actuating the brake 33 (Fig. 1), the main switching lever 32 is now displaced to bring the cage to a stop. The center drilling is now effected by actuating the lever 48 whose rotation causes the two drill spindles to advance toward each other. The drill motors 44 are then to be switched in. This is preferably done automatically by having the initial actuation of lever 48 actuate a trip switch (not shown) in one of the slides 46. Consequently, the drill spindles are in revolution when during the further displacement of lever 48 the spindles enter into contact with the ends of the body 1 so that holes are drilled on the inertial axis of body 1. When the drilling is completed, the drilling tools are shifted back to their rest position. After releasing the latch pins 23, the locking levers 22 are opened and the accurately centered crankshaft can be removed.

The unbalance weights E are individually displaceable so that the resultant unbalance can be adjusted in magntiude and the resultant center of gravity (unbalance mass center) can be shifted through an angular range about the axis of rotation; and they may to this end alternatively consist of displaceable annular structures around the axis of rotation. Before describing this more in detail, an explanation will be given of how the unbalance weights E are to be dimensioned and positioned with respect to the rotor to secure the result that the subsequent machining and finishing of the workpiece body about its center-marked axis will also represent the final balancing operation to then make the body run substantially free of unbalance oscillations and with a correct concentric run of its essential surface zones.

To this end, the vectorial magnitude of the intentionally provided discrepancy between center axis and inertia axis of the center-marked body may be determined in accordance with the unbalance of the unfinished body prior to the balancing run and the geometric shape of the body.

For simplicity of further explanation, let us at first suppose that the just-mentioned method is to be performed with a disc shaped body so that a balance adjustment is needed in only one correction plane, it being understood that for an axially extensive body the method must be carried out for each of two axially spaced correction planes as shown in Figs. 1 to 3, so that the body, when center adjusted, retains a corrective unbalance moment in each of the two planes.

Figure 5:
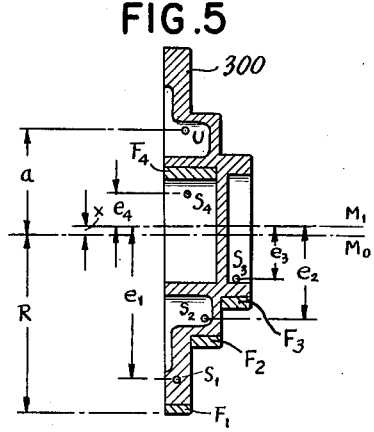
Figure 6:
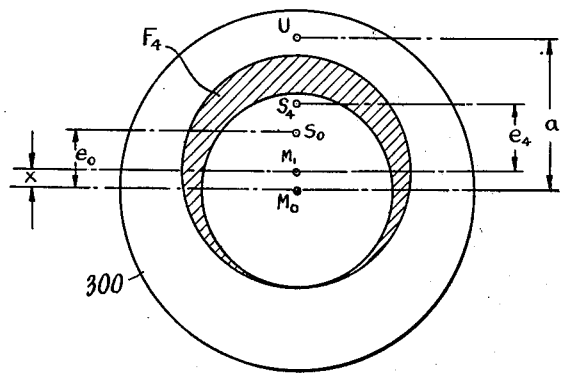
Fig. 6 is another explanatory front view of the same rotor.
Figure 9:
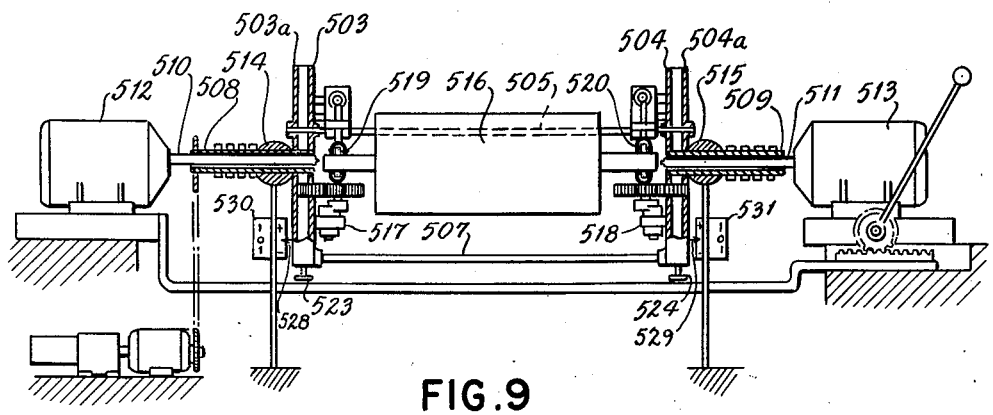
Fig. 9 is a part-sectional side view of another balance-centering apparatus according to the invention comprising a center drilling machinery.

In Figs. 4 and 5, the largest radius of a disc-shaped, stepped rotor body 300 is denoted by R. The geometric center axis of the rotor, indicated at $M_0$, is hereinafter referred to as the "primary axis." The rotor is assumed to have a local unbalance weight represented by its mass center U whose distance from the primary axis $M_0$ is denoted by $a$ and which has a particular angular position with respect to the primary axis. The assumed or inherent unbalance U lies along a diameter through the geometric center axis $M_0$ of the rotor. This diameter is the reference diameter for all subsequent balancing operations and when required may be used to index the rotor in the balance centering machine. The location of the reference diameter is predetermined by the characteristic shape of the article, by non-controllable dissymmetrical machining operations, or by eccentricity purposely built into the rotor to supply material for subsequent machining in accordance with the invention to simply and accurately achieve balance simultaneously with the final machining operations. The reference diameter is thus readily apparent by inspection and appropriate index marks, if desired, can be made on the periphery of the rotor. It will be noted that rotors to be balanced according to the invention are such as have portions to be machined that are substantially symmetrical about an axial plane containing the reference diameter. The unbalance moment caused by the local unbalance weight U, relative to the primary axis $M_0$, is equal to the product of $U \cdot a$. Due to this unbalance, the gravity center $S_0$ of the entire rotor is spaced a distance $e_0$ from the primary axis $M_0$. For clarity of illustration, the distance $e_0$ is shown exaggerated.

The conventional method of eliminating the unbalance by mass centering requires that the main inertia axis through the gravity point $S_0$ be brought into coincidence with the axis of rotation, for instance, with the primary axis $M_0$. In contrast, the balance centering method according to the invention does not result in such a coincidence but aims at establishing a machining axis $M_1$ at a predetermined distance $x$ from the primary axis $M_0$ along the reference diameter. The desired machining axis $M_1$ is hereinafter referred to as the "secondary axis." When the secondary axis $M_1$ is established and the body is subjected to machining about this axis, the machining has the effect of eliminating along the periphery of the body an amount of material corresponding to the cross-hatched sickle-shaped area $F_1$, thus reducing the body to the radius $R_1$. Thereafter, the body is balanced about the secondary axis $M_1$ for a centrical and vibration-free run. The static moment of the area $F_1$, or briefly its unbalance, amounts to $F_1 = S_1 \cdot e_1$, if $S_1$ denotes the weight acting in the center of gravity and $e_1$ the distance of the gravity center of the sickle-shaped area $F_1$ from the secondary axis $M_1$.

If now, according to the invention, an equalizing weight is provided whose moment, for each given radius of the rotor zone to be subsequently eliminated by machining, satisfies the equation $S_1 \cdot e_1 = f(x)$, then the correction unbalance $S_1 \cdot e_1$ to remain in the rotor after the center-balancing and prior to the machining can directly be compensated by simply displacing the equalizing weight simultaneously with the rotor as will be described below with reference to Figs. 7 and 8, thus determining in a simple manner the proper secondary axis $M_1$ about which the final machining is to be performed in order to eliminate the original unbalance $U \cdot a$ of the rough rotor as well as the corrective unbalance $S_1 \cdot e_1$ purposely left in the rotor prior to the machining operation. Such an equalizing weight will lie on the reference diameter and be opposed to the weight $S_1$ resulting from the sickle-shaped area $F_1$ subsequently to be removed.

During the balance centering according to the invention the rotor revolving together with the equalizing weight in proper angular relation to one another, as described above, is displaced relative to the axis of revolution until a balance indicating instrument shows the balance condition. The reason why there is balance about the axis $M_1$ thus established is the fact that, for instance relative to the area $F_1$, the following equation is satisfied:

$S_t \cdot (x - e_0) = S_1 \cdot e_1$, wherein $S_t$ denotes the total weight of the rotor prior to the final machining. This defines the necessary distance $x$ of displacement as:

$$x = \frac{(S_t \cdot e_0) + (S_1 \cdot e_1)}{S_t} \quad (A)$$

The rotor according to the example of Figs. 4 and 5, however, has four areas or unbalance moments which are to be centered by final machining. The outer sickle-shaped areas $F_2$ and $F_3$ have respective mass centers $S_2$ and $S_3$ spaced from the secondary axis $M_1$ by respective distances $e_2$ and $e_3$. The foregoing considerations relating to the area $F_1$ are also applicable to areas $F_2$ and $F_3$. The fourth area of the illustrated example involves an unbalance to be eliminated by machining a center bore of the rotor. This fourth unbalance area $F_4$ may have a mass center $S_4$ at a distance of $e_4$ from axis $M_1$. Consequently, the static moment of this area has a diminishing effect upon the magnitude of the displacement distance $x$. This is because balance about axis $M_1$ obtains if:

$$S_t \cdot (e_0 - x) = S_4 \cdot e_4 \quad (B)$$

from which the displacement distance $x$ results as:

$$x = \frac{(S_t \cdot e_0) - (S_4 \cdot e_4)}{S_t} \quad (C)$$

Consequently, the rotor illustrated in Figs. 4 and 5 requires a total correction unbalance $S \cdot e$ which compensates for the algebraic sum of the static moments of the sickle-shaped areas $F_1$ to $F_4$:

$$(S_1 \cdot e_1) + (S_2 \cdot e_2) + (S_3 \cdot e_3) - (S_4 \cdot e_4) = S \cdot e \quad (D)$$

This compensation can, in principle, be effected by having a mass of constant weight revolve together with the rotor in the balance centering machine at a variable distance from the axis of rotation.

As mentioned, the equalizing weight for securing the compensation just explained may consist of a ring structure around the axis of rotation.

Figs. 7 and 8 show the arrangement of such an equalizing ring structure 301 on a flying chuck-type carrier 304 for accommodating the body 303 to be center balanced. The chuck 304 is mounted on the end of a shaft 305. The means for driving and oscillatorily journalling the shaft, and the electric or other devices for analyzing two mutually perpendicular unbalance components are not illustrated because they may be similar to those previously described or to those referred to below with reference to the machine according to Figs. 9 to 12.

The body 303 is at first placed into the chuck in coaxial relation thereto and is connected with the chuck through two positioning device arranged in the two coordinate directions. Each device comprises a screw spindle 307 with two screw portions of mutually opposed threading sense. One threaded portion of spindle 307 engages the chuck 304. The other portion is in threaded engagement with a slidable part 312 for holding the body 303. The spindle 307 carries a disc or pinion 302 operable manually or by an electric positioning motor similar to the motors $Lv$ and $Lh$ mentioned in conjunction with the apparatus of Figs. 1 to 3. Each spindle 307 also carries an indicating scale 309. Disposed opposite each threaded spindle 307 is a helical compression spring 308 which is braced against a stationary stop face of the chuck. When the spindle 307 is being turned, the two opposingly threaded spindle portions operate to displace the equalizing ring 301 and the body 303 relative to each other simultaneously and preferably by respectively equal amounts, as is indicated in Fig. 8 by dot-and-dash lines for the horizontal displacement direction. Consequently, when the equalizing ring is shifted by means of the positioning device to the dot-and-dash line position 301', the body 303 moves simultaneously to the dot-and-dash line position 303', and the bore 310 of the body 303 moves to position 310'. As a result, the axis of revolution of body 303 is now shifted to coincide with the desired machining axis $M_1$ which is displaced from the actual mass center axis $M_0$ of body 303. The axis $M_1$ is then marked by means of a drill 250 (Fig. 7) on the body 303.

An example of a complete balance centering operation will be described presently with reference to Figs. 7 and 8.

Assume that a large number of series-manufactured similar workpieces of the general type shown in Figs. 7, 8 are to be finished and balanced by machining. At first the maximum unbalance moment $U \cdot a$ (in cmg) for the series of rough work-pieces to be finished is determined from specimen tests on a balancing machine, thus obtaining the required maximum amount $x$ for the displacement of the machining axis ($M_1$) in Fig. 4) from the geometric axis (primary axis $M_0$). Corresponding to the parts or zones of the workpieces that are to run concentrically when the work-piece is finished, the corrective moment $S \cdot e$ to be eliminated is calculated in accordance with Equation A, thus obtaining the conditions to be satisfied by the equalizing weight needed for center-balancing each rotor of the same series. The equalizing weight, consisting of a ring-shaped structure as shown at 301 in Figs. 7 and 8, is of such size and weight as to provide the predetermined displacement $x$ in the rotor when the rotor is balanced with respect thereto by adjustment of the positioning devices as described below. The ring is first balanced on the balancing machine so as to run free of oscillations when concentrically mounted on the balance chuck of the machine. Then the workpiece is mounted on the chuck and caused to revolve together with the equalizing ring 301. The unbalance components are then indicated, for instance, by a wattmetric device of the kind described previously, and the positioning devices including the spindles 307 of the chuck are then correspondingly operated thus displacing the part and the equalizing ring for each of the two unbalance components until the entire unit revolves free of oscillations. This is apparent from the fact that then the wattmeter indications for both component directions are zero. Thereafter the body is center marked at point $M_1$, or the drill is applied to widen the bore 310 (Figs. 7, 8) of the body to make the bore concentric to the center point $M_1$. Since the corrective moment supplied by the ring is fully adjustable as to angular position about the rotor, it is not necessary to index the rotor in the chuck as would be required if fixed corrective weights were used on the chuck, for example as illustrated in Fig. 2. However, in order to minimize the amount of adjustment required to bring each successive rotor of the series to balance for center marking or machining, it is preferable that they be correspondingly positioned as to angular relation in the machine.

When each successive workpiece of the series is thereafter removed from the machine and the excess material is machined away by turning the workpiece about the center axis, the unbalance is eliminated and the predetermined zones of the body will run free of wobbling. Each further machining of the workpiece at the zones to be machined about the marked center axis has no effect on the mass distribution of the workpiece. This method permits observing an accuracy within 0.01 mm. departure from the true gravity center.

As mentioned, if a balancing in two correction planes is required, the above-described method is to be carried out for each of the two planes so that in each plane a predetermined equalizing weight is arranged and displaced in the above-explained manner.

As apparent from the foregoing, the invention is not limited to operations that require a center marking of a solid-center workpiece to be subsequently machined but may also be used to advantage simply for the proper positioning of rotating bodies that do not permit being center marked, as is the case with ring-shaped bodies. Then the invention may serve to center-position the workpiece in a machine tool that is to perform a machining operation about a geometrical center axis determined and adjusted as described in the foregoing.

It will be recognized that by the above-described method the unfinished workpiece is adjusted to a purposely "false" center position which becomes the true inertia center when the workpiece is subsequently finished by machining about the "false" center axis. Such a method, according to another feature of the invention, to be explained with reference to Figs. 9 to 12, may also be carried out, without directly relying on geometric shape or dimensions of the workpiece, by simply adjusting the inertia axis of the workpiece to the desired discrepancy from the revolving axis in dependence upon the expected mass behavior of the finished workpiece. In this manner, the balance condition of the subsequently finished workpiece is anticipated and simulated during the balance-centering run of the still unfinished workpiece.

This method affords outstanding advantages for the series manufacture of a large number of similar bodies such as crankshafts of the same design and dimensions. The machining operations to be performed on such a series of similar workpieces are substantially uniform in geometric respects and as regards mass distribution of the workpiece. By balancing individual test specimens of the series, the unbalance originally inherent in the body of the series and also the residual unbalance remaining after completion of the bodies is determined, preferably by measuring two directionally coordinate unbalance components for each correction plane as described earlier in this specification. All corresponding unbalance values of the tested specimens are combined to an average value. The average values thus obtained are then used for the balance centering of the entire series of workpieces. In other words, all workpieces pertaining to the same series of manufacture, such as a large number of unfinished crankshafts to be machined, are given a center marking in accordance with the invention under consideration of the average unbalance value or values gained from a preceding test of a limited number of samples taken from the same series. A balancing machine suitable for this method is exemplified by Figs. 9 to 12 and will be described presently.

The machine according to Figs. 9 to 12 is equipped with a cage structure comprising two chuck-type end discs 503 and 504 rigidly interconnected by three rods schematically shown at 505, 506 and 507. The two discs are mounted on respective hollow shafts 508 and 509 to be traversed by the respective drills 510 and 511 of two drill presses 512 and 513. The cage structure is journalled at both sides in oscillatively mounted bearings 514 and 515. During the machine operation the body 516 is firmly secured in the cage by pairs of 90° displaced holding means 517 in disc 503 (only one shown) and oppositely disposed pairs of 90° displaced holding means 518 (only one shown) which are designed as positioning devices to permit a shifting of the body during the rotation of the cage substantially in the manner previously described in conjunction with Figs. 1 to 3. The body 516 is forced against the displaceable members of the two positioning devices by means of springs loaded pins 519 and 520 respectively. Mounted on each of the two end discs 503 and 504 of the cage are two respective pairs of weights 521, 522. The two weights of each pair are 90° displaced relative to each other. The mounting of the pair on disc 504 is apparent from Fig. 11 where the two weights of the pair are denoted by 522 and 522a. Each weight is radially displaceable by means of a pertaining adjusting spindle 523 and 524 (Figs. 10 and 12), and each weight carries a pointer 529 (Fig. 12) which is movable in front of an indicator scale as shown at 530 and 531 in Figs. 10 and 12. The weights are protected by cover discs 503a and 504a. The rotor is preferably so indexed or oriented in the cage that its center of mass at each end of the rotor lies along a reference diameter extending between the lines of movement of the pertaining displaceable weights.

Figure 10:
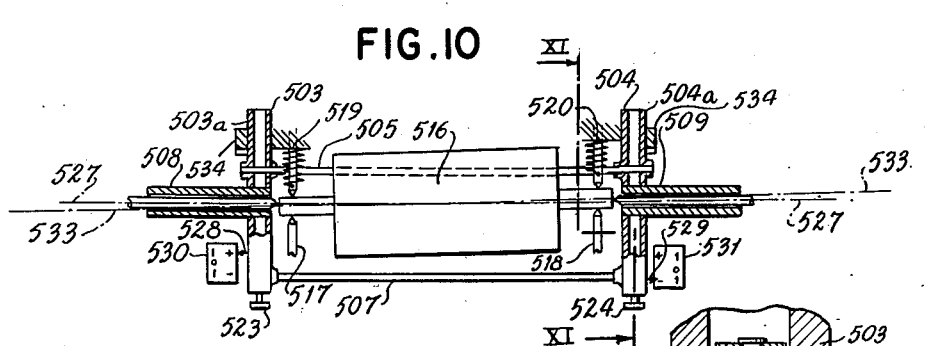
Fig. 10 shows separately and schematically a portion of the apparatus of Fig. 9 representing some of its elements disproportionately large for explanatory purposes.
Figure 11:
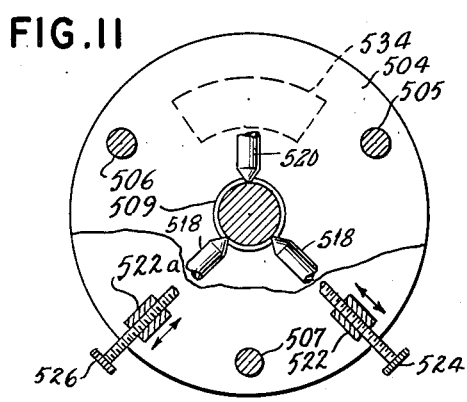
Fig. 11 is a vertical axial cross section through part of the same apparatus, along the sectional plane denoted in Fig. 10 by XI—XI, but turned 45° from the position of Fig. 10.
Figure 12:
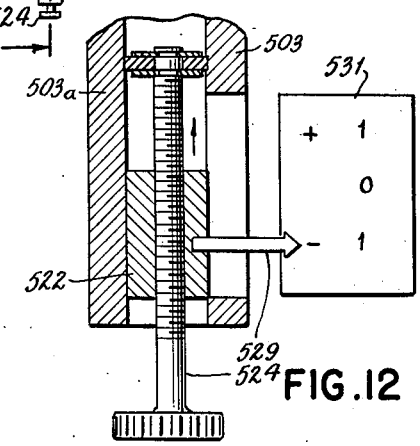
Fig. 12 shows a detail of the machine according to Figs. 9 to 11.

Figs. 10 and 11 show the weights 521 and 522 in an adjusted position for producing a predetermined displacement of the inertia axis 533 of body 516 relative to the axis of revolution 527 to thus provide a predetermined amount of unbalance and/or a predetermined unbalance moment during the balance centering operation. Pointer 528 is set to indicate the value $+1$, while pointer 529 indicates the value $-1$. This unbalance, or rather this unbalance moment, is adjusted with the aid of the adjusting spindles of the two weight pairs before the body 516 is mounted on the cage structure. The value of the unbalance moment to be thus pre-adjusted is previously determined as the average value of specimen tests as will be explained in the following.

The measuring of magnitude and phase position of an unbalance and the means and manner of displacement of the body inertia axis relative to the axis of revolution to a position in which the center marks are to be applied need not be further described, because in this respect the method and means used may be similar to those described with reference to Figs. 1 to 3; and it will be understood that the balance analysis proper may be carried out with any of the various means generally known as such for balancing purposes.

Referring to Figs. 9 to 12, the center-balancing may be carried out as follows. At first, a relatively small number of workpieces, for instance, ten to twenty sample specimens taken from a large number of series-manufactured workpieces to be center marked, are balanced on the illustrated or on any other suitable balancing machine, and the inertia axis thus determined is marked on each specimen. For instance, if the workpieces are crankshaft blanks, these blanks are first balance-centered about their inertia axis. Thereafter the specimens are finished by machining. The completed specimens are again balance-analyzed on the balancing machine, and their residual unbalance is determined and its degree of uniformity as regards position and magnitude is noted. Then, the average values are determined from the individual unbalance value thus found. These average values are then taken as a measure for setting the above-described machine according to Figs. 9 to 12 to the predetermined unbalance or unbalance moment by correspondingly adjusting the weights 522 and 523 with the aid of pertaining indicating pointers and scales. Once the machine is thus adjusted, each other workpiece of the series from which the test specimens were taken can be balance-centered on the machine so that the inertia axis of the revolving cage-and-body unit coincides with the axis of revolution, this being indicated by the fact that the unit then runs free of unbalance oscillations. While thus the revolving unit is adjusted to its true center axis, it will be recognized that due to the presence of the preadjusted unbalance moment, the body, considered alone, remains unbalanced in such a particular manner that its future mass behavior, that will exist upon completion of the final machining, is anticipated or simulated during the balance-centering run. Consequently, when the bodies, center-marked under the simulated balance conditions, are thereafter subjected to the final machining operation, the resulting finished bodies are substantially balanced and will have a balance accuracy within the desired tolerances. Tolerances of 0.001 to 0.01 mm. can readily be satisfied in this manner.

The foregoing explanation relates mainly to bodies of substantially symmetrical design. There are also cases where the further fabrication or the final machining involves asymmetrical conditions, for instance, when out-of-center holes are to be drilled into the body. It may then happen that the unbalance effects resulting from individual machining steps add to, or subtract from, those occurring during other steps of operation. In all such cases the necessary unbalance moment to be pre-adjusted on the centering machine can be determined by the above-described sample testing of prebalanced and thereafter finished specimens. When the prefabricated bodies to be processed are asymmetrical, such as eccentrics, an additional invariable but preferably exchangeable unbalance moment, for instance, in the form of an equalizing weight as shown at 534 in Fig. 11, is provided at both end discs of the cage. This additional weight has the purpose to equalize the constant unbalance moment of the asymmetrical body while this body is subjected to the center-balancing method according to the invention. The inevitable asymmetry of such a body may also be correlated to that of a supplementary body so that the two parts when joined, for instance those of a composite double eccentric, satisfy the condition of symmetry thus making the composite body capable of running as a unit free of unbalance. Another example of such a pair of correlated asymmetric bodies is the crankshaft of a one-cylinder engine and the pertaining weight-asymmetric fly wheel. The moment produced by the equalizing weight 534 than corresponds to the asymmetric position of the inertia axis of the body relative to its axis of revolution, i. e. the inertia axis of the body has a given distance from the marked center axis of revolution while this body is being machined subsequent to the center marking operation.

It will be obvious to those skilled in the art, upon a study of this disclosure, that my invention permits of various changes and modifications and may be embodied by means other than those specifically illustrated, without departing from the objects and essence of the invention and within the scope of the claims annexed hereto.

I claim:

1. Apparatus for the balance-centering of rotors, comprising a support, a rotatable carrier oscillatorily mounted on said support, drive means connected with said carrier for rotating it, unbalance measuring means having pickup means responsive to unbalance oscillations of said carrier, holding means on said carrier for mounting a body to be balanced, said holding means being selectively adjustable in two given coordinate directions respectively within a radial plane transverse of the rotation axis of said carrier for displacing the inertia axis of said body relative to said rotation axis, weight means mounted on said carrier to provide controllable unbalance, and two displacing means mounted on said carrier and engaging said weight means for displacing said weight means relative to said carrier, said two displacing means being angularly spaced from each other in said plane and forming two coordinate paths of weight displacement in respective radial directions intersecting each other at a right angle in said plane.

2. Apparatus for the balance-centering of rotors, comprising a support, a rotatable carrier oscillatorily mounted on said support, drive means connected with said carrier for rotating it, unbalance measuring means having pickup means responsive to unbalance oscillations of said carrier, holding means on said carrier for mounting a body to be balanced, said holding means being selectively adjustable in two given coordinate directions respectively within a radial plane transverse of the rotation axis of said carrier for displacing the inertia axis of said body relative to said rotation axis, two weights mounted on said carrier in eccentric relation to said rotation axis and being displaceable in said plane relative to said carrier toward and away from said rotation axis, said weights having respective paths of displacement in respective radial directions intersecting each other, and two adjusting means mounted on said carrier and connected with said respective weights for selectively displacing them along said respective paths, whereby said two weights have in said plane a resultant center of gravity displaceable angularly about said rotation axis.

3. In apparatus according to claim 1, said weight means consisting of a single annular structure inherently balanced about its geometric center and mounted on said carrier about said rotation axis, said structure being displaceable in all radial directions relative to said rotation axis.

4. Apparatus for the balance-centering of rotors, comprising a support, a rotatable carrier oscillatorily mounted on said support, drive means connected with said carrier for rotating it, unbalance measuring means having pickup means responsive to unbalance oscillations of said carrier, holding means for the rotor to be balanced, said holding means being mounted on said carrier and having two positioning devices, said devices having respective positioning directions which form together a right angle in a radial plane transverse of the rotation axis of said carrier, said holding means displaceably mounting on said carrier a body to be center balanced, each of said devices having a part movable in said radial plane in the opposite direction relative to said holding means, and an annular weight structure inherently balanced about its geometric center and mounted on said two devices in engagement with said two parts so as to be displaced simultaneously with the body but in the opposite direction.

References Cited in the file of this patent

UNITED STATES PATENTS

| | | |
|---|---|---|
| 1,761,945 | Van Degrift | June 3, 1930 |
| 2,140,398 | Buckingham | Dec. 13, 1938 |
| 2,219,795 | Van Degrift | Oct. 29, 1940 |
| 2,243,379 | Johnson | May 27, 1941 |
| 2,315,998 | Haeger | Apr. 6, 1943 |
| 2,363,373 | Werner | Nov. 21, 1944 |
| 2,536,566 | Pascoe et al. | Jan. 2, 1951 |